United States Patent Office 3,317,614
Patented May 2, 1967

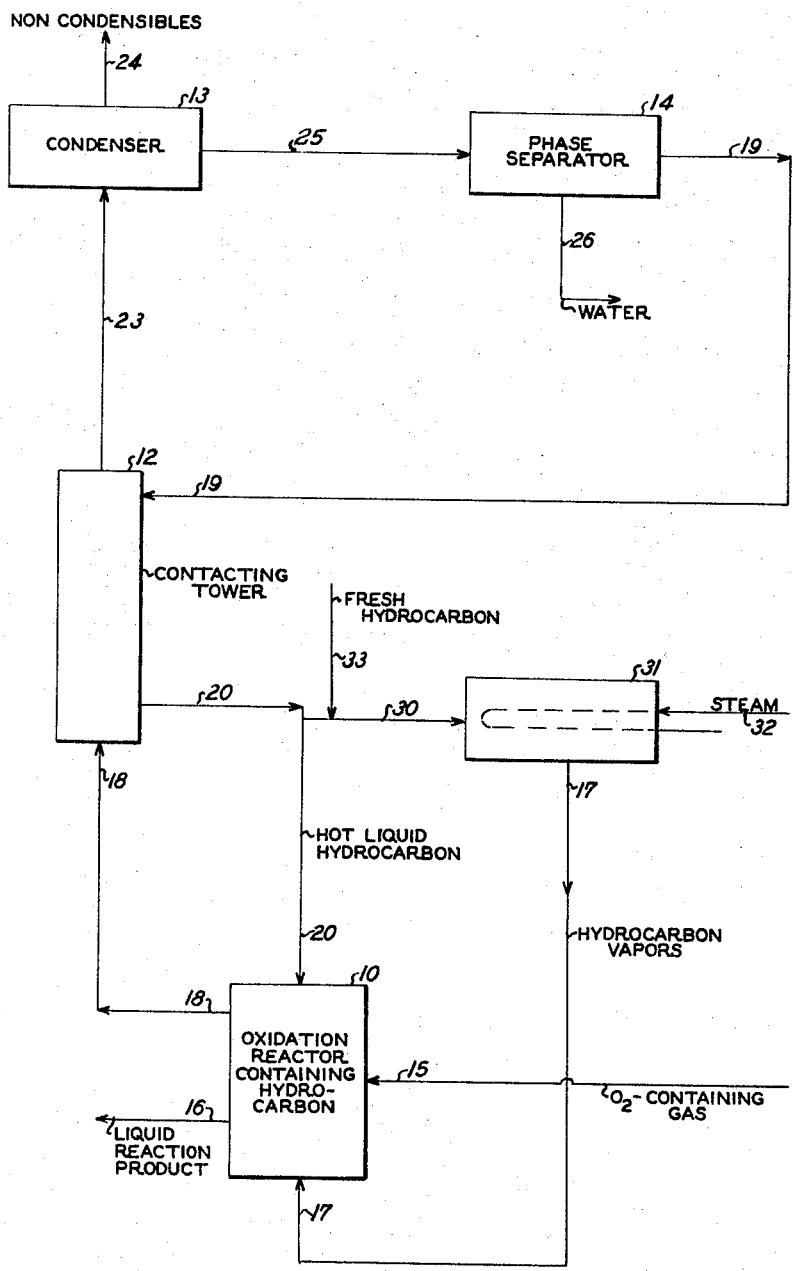

3,317,614
PARTIAL OXIDATION OF HYDROCARBONS
Richard L. Marcell, Bergenfield, N.J., assignor to Halcon International, Inc., a corporation of Delaware
Filed Jan. 2, 1962, Ser. No. 163,709
2 Claims. (Cl. 260—631)

This invention relates to process for the liquid phase partial oxidation of hydrocarbons with a molecular oxygen containing gas more particularly to such processes wherein a part of the hydrocarbon is vaporized from the reaction system, condensed and recycled thereto and especially to such processes wherein the reaction mixture is heated by means of such hydrocarbon in the vapor form.

Processes for the liquid phase partial oxidation of the hydrocarbons have achieved commercial success. However water, formed during the oxidation or otherwise introduced into the reactor may interfere with the reaction for producing the desired product.

One known technique for removing water from the reactor is to withdraw it as a vapor along with unreacted vaporized hydrocarbons and non-condensible gases. The total of these vapors, known as "boil-up," are subsequently cooled. The water and hydrocarbons are condensed and settled, the water phase and the hydrocarbon phase are separated, the water is discarded and the hydrocarbon is recycled to the reactor. Boil-up rate is determined by many factors, such as the temperature and the pressure of the reactor. Large boil-up may also be required where it is necessary to have a low oxygen partial pressure. This procedure suffers from many disadvantages. There is poor (indirect) heat transfer in the reactor if a coil or jacket is used due to caking, especially if the reaction mixture is a slurry. In order to separate the boiled up hydrocarbons and water it is necessary that they be cooled and condensed. Upon recycling the cold hydrocarbons, it becomes necessary to add large amounts of heat to the reactor to maintain proper reaction conditions. The condensation of the vaporous hydrocarbons requires the removal of large quantities of heat and sizable condensing surfaces, additionally increasing the cost of the process.

The art is confronted with the problem of providing even more efficient liquid phase partial oxidation process which minimize or avoid these disadvantages.

The discoveries associated with the invention and relating to the solution of the above problems, and the objects achieved in accordance with the invention as set forth herein include the provision of:

A process for the liquid phase partial oxidation of hydrocarbons with a molecular oxygen containing gas in an oxidation zone, vaporizing a portion of said hydrocarbon and introducing the resulting vapors into the oxidation zone, whereby the latter is heated, optionally withdrawing a gaseous effluent containing unreacted hydrocarbon and water, condensing and separating hydrocarbon from said gaseous effluent and introducing separated hydrocarbon into said oxidation zone (as set forth in U.S. application Serial No. 140,794, filed Sept. 26, 1961 now Patent No. 3,109,864);

Such a process wherein the hydrocarbon is a cycloalkane;

Such a process wherein the cycloalkane is cyclohexane;

Such a process wherein the hydrocarbon is reacted with the molecular oxygen containing gas in the presence of a boron compound;

Such a process wherein the boron compound is meta boric acid;

Such a process including intimately contacting the gaseous effluent with a relatively cool liquid stream of the hydrocarbons;

Such a process wherein the relatively cool liquid stream of hydrocarbons contains emulsified water; and Other objects which will be apparent as details or embodiments of the invention are set forth hereinafter.

The accompanying drawing is a schematic flow diagram of one embodiment of the invention.

In order to indicate still more fully the nature of the present invention, the following examples of typical procedures are set forth in which parts and percents mean parts and percents by weights, respectively unless otherwise indicated, it being understood that these examples are presented as illustrative only and they are not intended to limit the scope of the invention.

EXAMPLE 1

Referring to the drawing, the batch oxidation reactor 10, which is charged with 308 parts of meta boric acid and 2711 parts of cyclohexane, is maintained at a temperature of about 330° F. and a pressure of 120 p.s.i.g. Air is introduced into the reactor 10 through line 15 and about 77 parts of $O_2$ absorbed. About 8% of the cyclohexane reacts and the liquid reaction mixture withdrawn through line 16. This reaction mixture is treated to recover the product in any desired manner, such as that disclosed in the aforementioned patent application.

Heat is introduced into the reactor 10 by means of hydrocarbon vapor supplied by line 17. This vapor is produced in heater 31 by means of steam introduced therein via line 32. Hydrocarbon is introduced into the heater 31 as fresh material via line 33 or as recycled material from lines 20 and 30 (described below). The amount of hydrocarbon vapor is sufficient to maintain the reaction mixture at the temperature desired, as well as provide the desired boil-up.

In this way, efficient heat transfer is achieved without caking or coating on heat transfer surfaces, which would be the case if an indirect heater such as a steam coil or jacket were used in contact with the reaction mixture. The reaction mixture may be in the form of a slurry, some of the inorganic material being present as a solid, which introduces severe caking problems with indirect heaters. However, the invention avoids such difficulties.

A high boil-up is maintained and the vapors removed from the reactor through line 18 contain about 3200 parts of cyclohexane, 63 parts of water and 254 parts of nitrogen. Preferably, these vapors, at a temperature of about 330° F., are passed to the contacting tower 12. This tower may be a spray tower, packed column or other conventional apparatus. In the contacting tower 12, the hot vapors are brought into direct contact with cold recycle liquid cyclohexane containing water. This latter stream, containing about 1500 parts of cyclohexane and about 15 parts phased water, enters the contacting tower 12 through line 19 at a temperature of about 100° F. The contact of the two streams results in (1) the condensation of about 1500 parts of cyclohexane and the cooling of the remaining vapors, (2) the heating of the cyclohexane liquid to about 310° F., and (3) the stripping out of the water from the liquid recycle stream. The heated cyclohexane stream is withdrawn from the contacting tower 12 through line 20 and contains about 3000 parts of essentially water-free cyclohexane. A part of this stream is passed back to the oxidation reactor 10 wherein it may undergo further reaction. The cooled vapors (containing 1700 parts of cyclohexane, over 70 parts of water, and 254 parts of nitrogen) leave the top of the contacting tower 12 through line 23, and pass to condenser 13 wherein essentially all of the cyclohexane and water are condensed. Non-condensible gases, e.g. nitrogen, are removed via line 24, this stream contains about 200 parts of cyclohexane vapor which may be recovered in a subsequent scrubbing operation. Through line 25, the cyclohexane water condensate, at a temperature of about 100° F., passes to phase separator 14. About 63 parts of water are removed from the bottom of the separator 14 through line 26 as the water phase and discarded. About 1500 parts of cyclohexane containing water are removed via line 19 and processed as previously described.

The non-condensible stream leaving the condenser 13 through line 24 may be recycled to the reactor, which procedure is particularly advantageous where oxygen concentrations less than that of air are desirable.

EXAMPLE 2

The procedure of Example 1 is repeated except that it is conducted in a continuous manner, the amount of fresh hydrocarbon feed being sufficient to maintain a substantially constant level in the reactor, with continuous drawoff of some liquid reaction mixture via line 16.

In any case whether the reaction is of the batch, semi-batch or continuous type, high efficiency is obtained by the elimination of heat transfer difficulties in the reactor. Shut-down requirements for cleaning heat transfer surfaces in the reactor are substantially eliminated.

Comparable results to the foregoing are achieved with various modifications thereof including the following. This invention is particularly important in hydrocarbon oxidation processes where boron compounds such as meta boric acid are added to the reactor mass in order to modify the extent of the oxidation reaction, which processes are set forth in U.S. application Ser. No. 85,987 filed January 31, 1961, now abandoned. A wide variety of hydrocarbons may be oxidized according to the process of the instant invention. Particularly applicable are lower molecular weight hydrocarbons having from 2 to 10 carbon atoms per molecule, preferably from 3 to 8. They may be either cyclic or acyclic compounds such as straight or branched chain paraffins including butane, pentane, methyl butane, etc. Particularly preferred are cycloalkanes such as cyclohexane.

The process conditions including the oxygen concentration, amount of boil-up, temperatures, pressure and flow rates and the like are selected to give the desired conversion of the hydrocarbon to produce the desired partial oxidation product.

In view of the foregoing disclosures, variations and modifications thereof will be apparent to one skilled in the art, and it is intended to include within the invention all such variations and modifications except as do not come within the scope of the appended claims.

What is claimed is:
1. The process for the liquid phase partial oxidation of a hydrocarbon comprising contacting a slurry of liquid hydrocarbon containing a dispersed solid boron compound in an oxidation zone with a molecular oxygen containing gas at oxidizing conditions, removing from said zone during the oxidation a gaseous mixture of hydrocarbon and water, cooling and condensing said removed gaseous mixture, separating condensed hydrocarbon from condensed water, heating and vaporizing separated condensed hydrocarbon in a zone separate from the said oxidation zone, and heating the said slurry in said oxidation zone by direct contact with hydrocarbon vapors vaporized in said separate zone.

2. The process for the liquid phase partial oxidation of cyclohexane comprising contacting a slurry of solid meta boric acid in liquid cyclohexane with a molecular oxygen containing gas at oxidizing conditions in an oxidation zone, removing from said zone during the oxidation a gaseous mixture of cyclohexane and water, cooling and condensing said removed gaseous mixture, separating condensed cyclohexane from condensed water, heating and vaporizing separated cyclohexane in a zone separate from the said oxidation zone, and heating the said slurry in said oxidation zone by direct contact with cyclohexane vapors vaporized in said separate zone.

References Cited by the Examiner

UNITED STATES PATENTS

| | | | |
|---|---|---|---|
| 2,434,888 | 1/1948 | Rust et al. | 260—451 |
| 2,767,203 | 10/1956 | Rambosek et al. | 260—451 |
| 3,006,944 | 10/1961 | Fenske et al. | 260—451 |
| 3,109,864 | 11/1963 | Fox et al. | |

LEON ZITVER, *Primary Examiner.*

ALPHONSO D. SULLIVAN, *Examiner.*

C. R. DAVIS, H. T. MARS, *Assistant Examiners.*